July 9, 1935.  C. R. BURRELL  2,007,156

LUBRICATING SYSTEM

Filed April 6, 1932  3 Sheets-Sheet 1

INVENTOR
Clarence R. Burrell

BY

ATTORNEYS

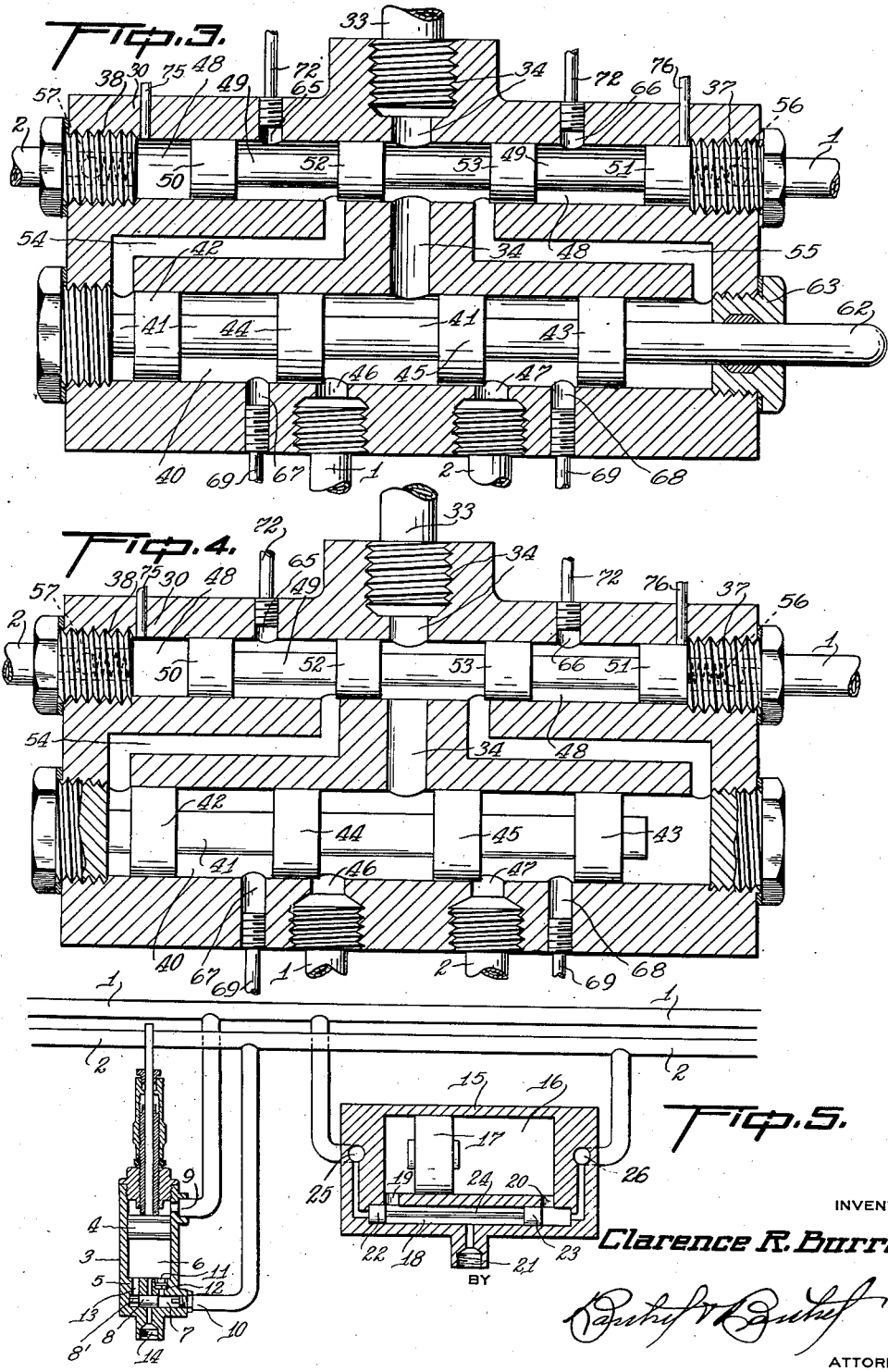

July 9, 1935.  C. R. BURRELL  2,007,156
LUBRICATING SYSTEM
Filed April 6, 1932  3 Sheets-Sheet 3
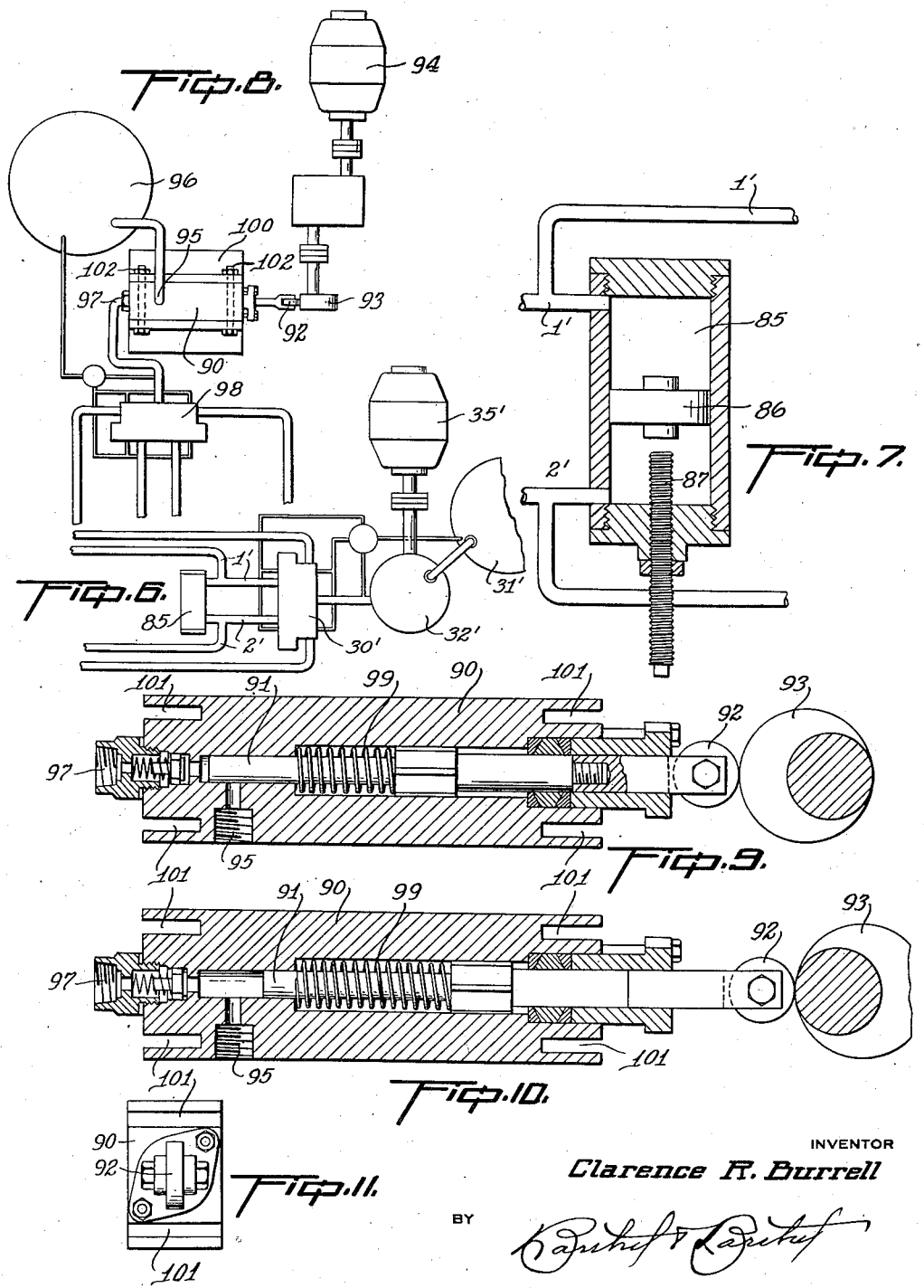
INVENTOR
Clarence R. Burrell
BY
ATTORNEYS

UNITED STATES PATENT OFFICE 2,007,156

LUBRICATING SYSTEM

Clarence R. Burrell, Cleveland, Ohio, assignor, by mesne assignments, to The Farval Corporation, Cleveland, Ohio, a corporation of Ohio Application April 6, 1932, Serial No. 603,590

9 Claims. (Cl. 184—7)

The present invention pertains to a novel lubricating system of the dual line type wherein two feed lines are extended to the lubricating valves and wherein these lines are alternately supplied with lubricant under pressure. The principal object of the invention is to provide automatic means, governed by pressure conditions in the system, for alternating the pressure from one line to the other at the proper moment.

More specifically, a single source of lubricant under pressure, such as a motor driven pump, is employed for supplying both lines. The pressure may be alternated from one line to the other by means of a manual four-way valve, as disclosed for example in the co-pending application of Leonard R. Kerns, Serial No. 341,958, filed February 23, 1929, but it is the object of this invention to do away with such manual means and to shift the flow of fluid under pressure automatically. Accordingly, the invention is characterized by the provision of a specially constructed self-reversing valve inserted between the pressure source and the two lines. The lines emanate from this control valve and also return thereto. The valve is so constructed as to connect the pressure source to only one of the lines at a time and further to reverse itself or connect the pressure source to the other line on the attainment of certain pressure conditions in the return ends.

The self-reversing valve may be used in conjunction with a single acting dual line valve as disclosed in the above mentioned application or with a double acting dual line valve as shown in the co-pending application of Aaron J. Jennings, Serial No. 462,765, filed June 21, 1930.

The invention is fully disclosed by way of example in the following description and in the accompanying drawings, in which—

Fig. 3 is a similar view of the valve in another position;

Fig. 4 is a similar section of a somewhat modified form of valve;

Fig. 5 is a detail section of certain of the measuring valves at the bearings;

Fig. 6 is a diagrammatic view of a modified form of system;

Fig. 7 is a detail section of the adjustable volume member thereof;

Fig. 8 is a diagrammatic view of another modified system;

Figs. 9 and 10 are longitudinal sections of the adjustable displacement pump thereof; and Fig. 11 is an end view of the pump.

Reference to these views will now be made by use of like characters which are employed to designate corresponding parts throughout.

Figure 1:
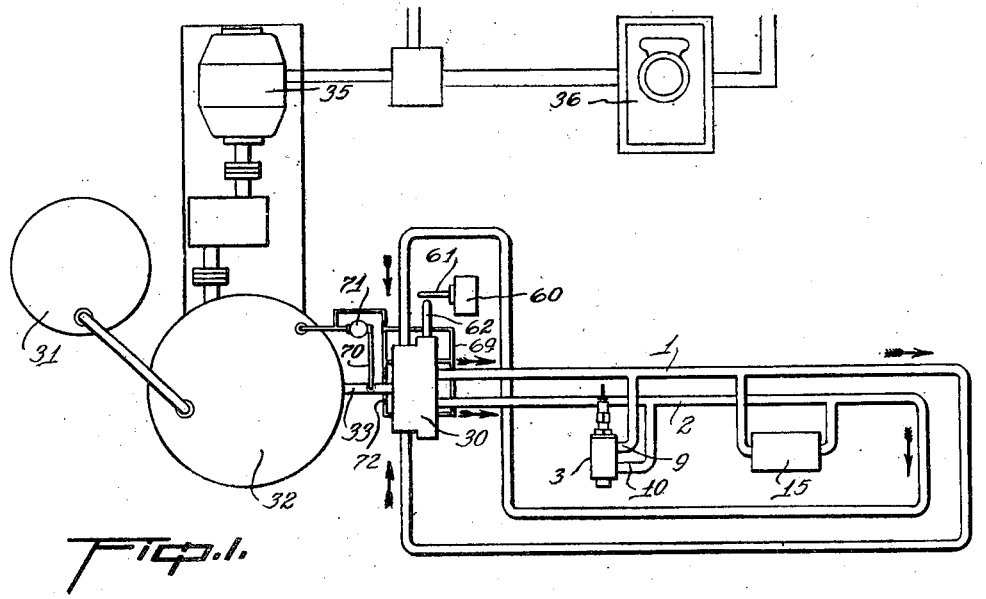
Figure 1 is a diagrammatic view of the system.

The system disclosed herein pertains to dual line operation wherein the measuring valves at the bearings are each subjected to fluid injected therein under pressure alternately from two separate lines. The valves may be single acting to discharge only once by injection from both lines or double acting to discharge twice by injection from both lines. A valve of each type is shown in Figure 5 connected to the pressure lines I and 2.

The single acting type of valve comprises a body 3 containing a piston 4 slidable therein. In the lower part of the body 3 is a partition 5 defining a cylinder 6 for the piston 4 and a valve chamber 7 containing a shuttle valve 8. The line I is connected at 9 into the cylinder 6 above the piston 4, and the line 2 is connected at 10 into one end of the valve chamber 7.

The partition has a loading port 11 connecting the two chambers, and this port contains a check valve 12 which opens in the direction towards the cylinder 6. The partition also has a discharge port 13, and finally there is an outlet 14 connecting the chamber 7 to the bearing to be lubricated.

Pressure in the line 2 and connection 10 fills the cylinder 6 and raises the piston 4. When the pressure is shifted to the line I and connection 9, the piston 4 is moved towards the partition 5. The reduced end 8' of the valve 8 at the port 13 enables the pressure beneath the piston to be communicated to this end of the valve and to move the same towards the connection 10, thereby placing the outlet 14 in communication with the cylinder 6 through the port 13.

The other measuring valve is of the double acting type and embodies a casing 15 having a main cylinder 16 with a piston 17 movable therein. Adjacent the cylinder is a valve chamber 18 with two ports 19 and 20 connected to the cylinder 16. An outlet 21 extends from the valve chamber to the bearing to be lubricated. The valve chamber contains a valve comprising two heads 22 and 23 connected by a rod 24. Inlets 25 and 26 are formed in the body 15 and are connected to the lines I and 2 respectively. The heads 22 and 23 are so spaced that in either extreme position of the valve structure, one of the ports 19 and 20 is open to the adjacent line and to the cylinder while the other port is closed to its adjacent line but connects the cylinder to the outlet 21. Thus, pressure in the line 2, for example, loads the cylinder 16 at one side of the piston 17 through the port 20, obstructs the cylinder from the line 1 and opens the other end of the cylinder to the outlet 21 through the port 19. When the pressure is shifted to the line 1, the cylinder 16 is similarly charged at the adjacent side of the piston and is discharged from the other side of the piston.

The lines 1 and 2 emanate from a self-reversing valve 30 which admits lubricant under pressure alternately to these lines as will presently be described. The supply of lubricant is contained in a drum 31 which in turn is connected to a pump 32 of any suitable type having an outlet 33 connected to the inlet passage 34 of the control valve. The pump is driven by an electric motor 35 which may be automatically started at predetermined intervals by means of an electric clock 36. The valve body 30 is formed with return ports 37 and 38, opposite one another, to which the return ends of the lines 1 and 2 are connected after having passed the last valve, as also illustrated in Figure 1. In other words, each line 1 and 2 forms a closed circuit including the control valve 30 and the several measuring valves at the bearings.

The valve body 30 is formed with a main valve chamber 40 containing a slidable rod 41 on which are formed two end heads 42 and 43 and two intermediate heads 44 and 45, each adapted to fill the chamber transversely. It will be seen also that the inlet passage 34 extends to the valve chamber 40. The lines 1 and 2 extend from outlets 46 and 47 respectively which are also in communication with the chamber 40.

Figure 2:
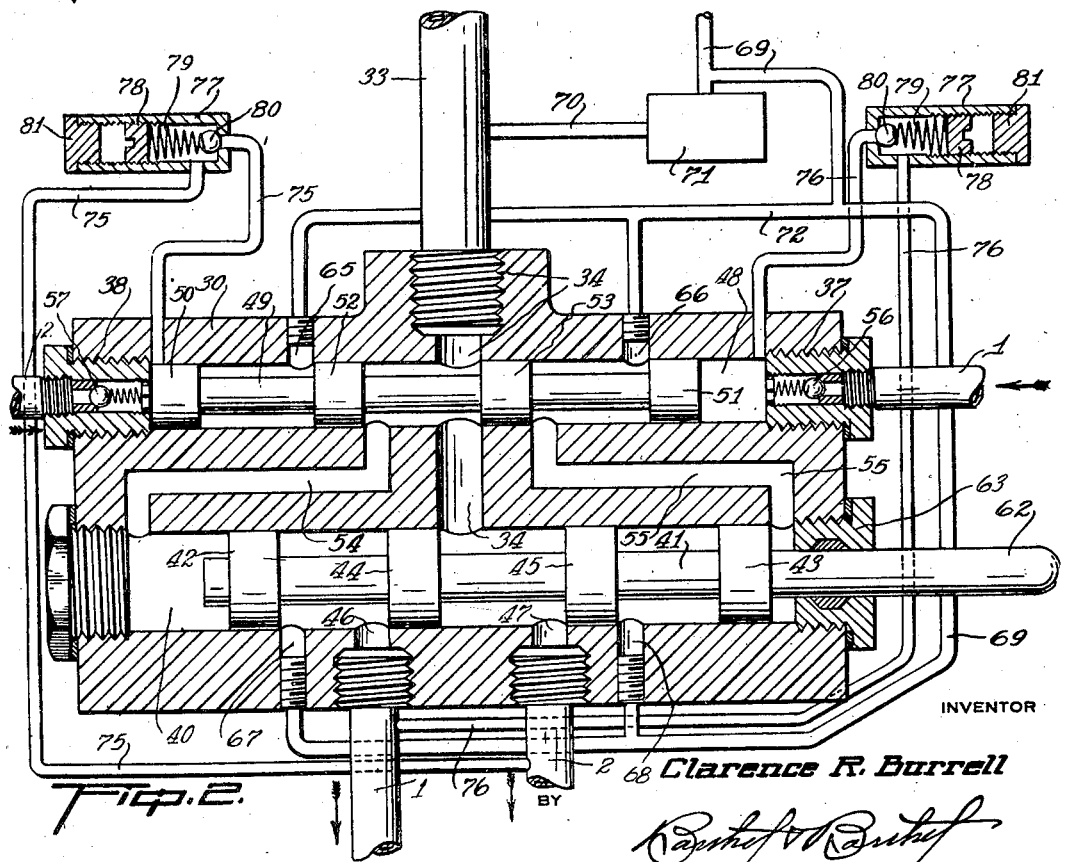
Fig. 2 is a longitudinal section of the self-reversing control valve.

The return ports 37 and 38 lead into opposite ends of another chamber 48 which traverses the inlet passage 34 as clearly shown in Figure 2. This chamber contains a pilot valve consisting of a rod 49 formed with end heads 50 and 51 and intermediate heads 52 and 53, each adapted to obstruct the chamber 48 transversely. Finally, the valve body 30 is formed with two passages 54 and 55 at opposite sides of the inlet passage 34, connecting the intermediate portion of the chamber 48 to opposite ends of the chamber 40 at the outer faces of the end heads 42 and 43.

The intermediate heads 44 and 45 are so spaced with relation to the outlets 46 and 47 that, in the extreme position of the rod 41 illustrated in Figure 2, the inlet 34 is in free communication with the outlet 47 through the chamber 40, while the outlet 46 is obstructed from the inlet passage 34 by the intervening head 44. In the other extreme position of the rod 41, as illustrated in Figure 3, the conditions are reversed, that is, the inlet 34 is in free communication with the outlet 46 through the chamber 40 and is obstructed from the outlet 48 by the intervening head 45.

The heads on the pilot valve are so positioned with respect to the passages 54 and 55 that, in the extreme position shown in Figure 2, the head 53 obstructs communication between the passage 55 and the inlet port 34, while the head 52 lies to the left of the passage 54 and permits communication of the latter with the port 34 through the chamber 48.

In the return ends of the lines 1 and 2 are mounted spring held check valves 56 and 57 respectively adapted to open towards the valve body 30 on the attainment of a predetermined pressure in said ends. Thus, when fluid under pressure is supplied to the line 2, as in Figure 2, it is communicated to the respective measuring valves and thence to the bearings, provided, however, that the pressure required to open the check valves is greater than that required to discharge the measuring valves into the bearings. This condition is of course provided for in the strength of the springs embodied in the check valves. When the valve 57 in the return end of the line 2 is opened in this manner, the pilot valve is shifted to the right, as illustrated in Figure 3, thereby obstructing the passage 54 from the inlet port 34 and connecting the inlet port to the passage 55. The valve 41—45 is thereby overbalanced on the righthand end and moved to the left, as in Figure 3, whereby the line 2 is cut off from the inlet passage 34 and the line 1 is connected to this passage. The effect of this transfer of pressure in the measuring valves has already been described, and when the check valve pressure is exceeded in the return end of the line 1, the pilot valve and then the member 41—45 are returned to the position shown in Figure 2.

This alternation of pressure in the lines 1 and 2 is continuous unless an arresting means is provided. Such means may consist of a switch 60 in the motor circuit and including a finger 61 extending adjacent one end of the valve 30. The rod 41 is formed with a stem 62 passing through a packing gland 63 in one end of the passage 40. The members 61 and 62 are so positioned relatively that the former is engaged when the latter is projected out of the valve 30, whereby to open the motor circuit and stop operation of the device. The motor is started again automatically by the time clock 36. In the modification shown in Figure 4, the stem 62 and associated switch 60 are not provided, and the action of the motor is controlled by a suitable automatic circuit maker and breaker.

A relief port 65 is drilled through the valve body 30 to the chamber 48 between the heads 50 and 52, and another such port 66 communicates with the chamber between the heads 51 and 53. Similarly, a relief port 67 is drilled to the chamber 40 between the heads 42 and 44, and another port 68 extends to the chamber 40 between the heads 43 and 45. A branched return line 69 connects the ports 67 and 68 to the reservoir. A by-pass 70 leads from the supply pipe 33 to the return line 69 and has a pressure relief valve 71 inserted therein. Another branched line 72 connects the ports 65 and 66 to the line 69. An excessive pressure developed in the pump will be relieved through the valve 71 before being communicated to the self-reversing valve 30 and the lines 1 and 2.

The heads 42 and 43 in moving to their end positions displace fluid through the passages 54 and 55 respectively towards the chamber 48, and this displacement is relieved through the ports 65 and 66 and the line 69. Valves comprising the parts 3—13 return fluid line 1 when the piston 4 is raised by pressure in the other line 2. Such return of fluid into either line is relieved through the ports 67 and 68 and line 69.

Although the lines 1 and 2 are described as having their return ends connected into the ends of the chamber 48, an equivalent connection may be made by means of T's taken from any point in the lines 1 and 2, inasmuch as it is only necessary that the pressure of these lines be communicated to the ends of the chamber 48. Such T's or other connections bringing the lines 1 and 2 into the ends of the chamber 48 are intended to be comprised within the scope of the term "return ends" as used throughout the specification and claims.

In order to prevent trapping of fluid in the ends of the chamber 48, bypasses 75 and 76 are extended from the ends of the chamber, at the return ends of the lines 1 and 2, to the lines 1 and 2 respectively at points where they emanate from the control valve 30, as clearly illustrated in Figure 2. In each bypass is mounted a check valve comprising a body 77 containing an adjustably mounted plug 78 which serves as the backing for a spring 79 holding a ball valve 80 in closed position with respect to the line 75 or 76 in the direction towards the return end. Another plug 81 is screwed in the rear end of the casing 77 for protective purposes, but when removed, permits access to the plug 78 by means of which the pressure of the spring 79 may be regulated.

When the pressure in line 2 reaches the point where it is sufficient to open check valve 57 and shift the pilot member 49, the fluid in the chamber 48 between the head 51 and return end 1 is forced through the bypass 76 after opening the check valve therein. This operation, however, requires accumulation of pressure behind the head 50, and this pressure must not be permitted to escape through the bypass 75. Inasmuch as the bypass 75 is connected at both ends to the line 2, now under pressure, the check valve 80 in the bypass is pressure balanced, and the fluid pressure necessary to open the same is determined by the adjustment of the spring 79. Thus, the spring 79 is set at the pressure at which it is desired that the pilot member 49 shall shift. The corresponding action of the check valve in the bypass 76 is obviously similar.

In Figures 6 and 7 is illustrated a so-called continuous system, that is, one that does not require a time switch and which is timed by mechanical devices within the system. The motor 35', reservoir 31', compressor 32', reversing valve 30' and lines 1' and 2' are similar to the corresponding parts in Figure 1, but it is to be noted that no time switch is employed for controlling the motor, the latter running continuously.

An adjustable accumulator or volume device is connected into the system at a suitable point, and in the present instance it is illustrated as comprising a cylinder 85 having its ends connected to the lines 1' and 2'. A piston 86 is slidable in the cylinder by the pressure in the lines, and the length of the stroke thereof is adjustably determined by a stop screw 87 threaded through one end of the cylinder. The cylinder must be filled, at one side or the other of the piston, before sufficient pressure can be developed in the lines 1' and 2' to operate the control valve. Consequently the interval between reversals of the control valve is dependent on the time required to fill the fluid system, including the volume available in the cylinder 85 at either side of the piston 86. The latter volume depends on the stroke of the piston which in turn is determined by the adjustment of the screw 87, and hence the operating frequency of the control valve is adjustable by the setting of the screw 87.

The system shown in Figures 8 to 11 is also operated by a continuously running motor, and the frequency of operation is governed by mechanical means within the system. The system is charged by a pump having a body or cylinder 90 containing a piston 91, the outer end of which carries a roller 92 engaged by a cam 93 driven from the continuously running motor 94. The intake 95 of the cylinder is connected to the reservoir 96, and the outlet 97 is connected to the reversing valve 98. A spring 99 within the pump body and bearing against the piston maintains the roller 92 in contact with the cam 93.

The pump body is mounted on a fixed base 100 and is formed at its ends with four elongated slots 101 through which are passed bolts 102 for securing the pump body to the base. On loosening the bolts, the pump body may be shifted lengthwise and secured, within limits, in any desired position relatively to the base or to the piston 91. As there is no check valve in the outlet 95, the actual displacement depends on the distance traveled by the piston towards the outlet after covering the inlet 95, and this distance is governed by the position of the body 90. By this means, the time required to develop sufficient pressure to shift the control valve is regulated.

It will now be seen that, in conformity with the principal object of the invention, there is provided an automatic means for alternating the pressure from one line to another as required in the operation of a dual line system.

Although specific embodiments of the invention have been illustrated and described, it will be understood that various alterations in the details of construction may be made without departing from the scope of the invention, as indicated by the appended claims.

What I claim is:

1. In a lubricating system, a pair of feed lines, a series of lubricating valves connected to said lines and adapted to be operated thereby, a control valve from which said lines emanate and to which said lines return, means for supplying lubricant under pressure to said control valve, means in said valve operable by pressure differential in the return ends of said lines, for alternately connecting said supply means to said lines, and means operable by said valve for arresting operation of said supply means.

2. In a lubricating system, a pair of feed lines, a series of lubricating valves connected to said lines and adapted to be operated thereby, a control valve from which said lines emanate and to which said lines return, means for supplying lubricant under pressure to said control valve, shiftable means in said valve having opposite faces exposed respectively to the return ends of said lines and operable by pressure differential in said ends, for alternately connecting said supply means to said lines, and timed means for controlling the operation of said supply means.

3. In a lubricating system, a pair of feed lines, a series of lubricating valves connected to said lines and adapted to be operated thereby, a control valve from which said lines emanate and to which said lines return, means for supplying lubricant under pressure to said control valve, means in said valve, operable by pressure differential in the return ends of said lines, for alternately connecting said supply means to said lines, timed means for starting operation of said supply means at intervals, and means operable by said valve for arresting operation of said supply means.

4. In a lubricating system, a pair of feed lines, a series of lubricating valves connected to said lines and adapted to be operated thereby, a control valve from which said lines emanate and to which said lines return, means for supplying lubricant under pressure to said control valve, means in said valve, operable by pressure differential in the return ends of said lines, for alternately connecting said supply means to said lines, and a device of adjustable volume in the system in fluid communication with said lines.

5. In a lubricating system, a pair of feed lines, a series of lubricating valves connected to said lines and adapted to be operated thereby, a control valve from which said lines emanate and to which said lines return, means for supplying lubricant under pressure to said control valve, means in said valve, operable by pressure differential in the return ends of said lines, for alternately connecting said supply means to said lines, and a device of adjustable volume connected directly to said lines.

6. In apparatus of the class described, a body having an inlet and a plurality of outlets and an exhaust, a primary valve means adapted to alternately connect the inlet with the respective outlets, secondary valve means adapted to control said primary valve means by directing pressure thereto from said inlet and connecting means between said outlets and the secondary valve means, whereby the latter is rendered operable.

7. In apparatus of the class described, a body having an inlet and a plurality of outlets and an exhaust, a primary valve means adapted to alternately connect the inlet with an outlet and simultaneously another outlet with the exhaust, secondary valve means adapted to control said primary valve means by directing pressure thereto from said inlet and connecting means between said outlets and the secondary valve means, whereby the latter is rendered operable.

8. In apparatus of the class described, a body having an inlet and a plurality of outlets and an exhaust, a primary valve means adapted to alternately connect the inlet with the respective outlets, secondary valve means adapted to control said primary valve means by directing pressure thereto from said inlet, connecting means between said outlets and the secondary valve means, whereby the latter is rendered operable and regulating means associated with said connecting means adapted to permit operation of said secondary valve means at predetermined outlet pressures.

9. In apparatus of the class described, a body portion having an inlet and at least two pressure outlets and an exhaust, a main pressure operated valve means located in said body portion adapted to alternate connections between the inlet and said outlets, and between said outlets and said exhaust, said body also being provided with connections between said inlet and the pressure operated portions of said valve means, a second valve means in said body interposed between said inlet and said last-named connections adapted to alternate the connections between said inlet and the pressure operated portions of said main valve means.

CLARENCE R. BURRELL.

DISCLAIMER 2,007,156.—*Clarence R. Burrell*, Cleveland, Ohio. LUBRICATING SYSTEM. Patent dated July 9, 1935. Disclaimer filed February 6, 1937, by the assignee, *The Farval Corporation*.

Hereby enters this disclaimer to the subject-matter of claims 6, 7, 8, and 9 of said Letters Patent.

[*Official Gazette March 2, 1937.*]